United States Patent [19]
Olson

[11] Patent Number: 5,908,081
[45] Date of Patent: *Jun. 1, 1999

[54] STEERING CONTROL SYSTEM FOR ARTICULATED VEHICLE

[75] Inventor: Douglas J. Olson, Valley City, N. Dak.

[73] Assignee: Case Corporation, Racine, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/658,881

[22] Filed: May 30, 1996

[51] Int. Cl.$^6$ .............................. B62D 5/07; B62D 5/26
[52] U.S. Cl. .............................................. 180/419
[58] Field of Search ................... 180/403, 418, 180/419, 420

[56] References Cited

U.S. PATENT DOCUMENTS

| | | |
|---|---|---|
| 3,380,547 | 4/1968 | Granryd ................... 180/419 |
| 3,800,903 | 4/1974 | Beals et al. .............. 180/419 |
| 3,991,847 | 11/1976 | Unruh . |
| 4,043,422 | 8/1977 | Barrett et al. . |
| 4,175,638 | 11/1979 | Christensen . |
| 4,304,316 | 12/1981 | Lang . |
| 4,368,797 | 1/1983 | van der Lely . |
| 4,565,257 | 1/1986 | Hanson . |
| 4,771,851 | 9/1988 | Nystven et al. ......... 180/419 |
| 4,802,545 | 2/1989 | Nystuen et al. . |
| 4,893,689 | 1/1990 | Laurich-Trost . |
| 5,194,851 | 3/1993 | Kraning et al. . |
| 5,234,069 | 8/1993 | Krone et al. . |
| 5,258,912 | 11/1993 | Ghoneim et al. ......... 180/6.2 |
| 5,269,389 | 12/1993 | Tomiyoshi . |
| 5,368,434 | 11/1994 | Kress et al. . |
| 5,417,299 | 5/1995 | Pillar et al. . |
| 5,489,005 | 2/1996 | Marcott et al. . |
| 5,562,175 | 10/1996 | Björsne et al. ......... 180/419 |

*Primary Examiner*—Anthony Knight
*Assistant Examiner*—John L. Beres
*Attorney, Agent, or Firm*—Foley & Lardner

[57] ABSTRACT

A steering system for an articulated vehicle having both steerable axle or wagon-wheel and articulation steering. A steering system is provided which is responsive to the position and rate of change of position of the articulated body portions with respect to each other, the position and rate of change of position of the steerable axle with respect to the body portion on which it is mounted, and operator steering direction input and the rate of change of that input, so as to provide transitions between the two types of steering which enhances operation of the vehicle. The steering system is also responsive to operator inputs as to the function for which the vehicle is being employed. The system also has the ability to dynamically adapt to the vehicle conditions, such as for adjusting transition between steering modes based upon past perfomance.

34 Claims, 3 Drawing Sheets

STEERING CONTROL SYSTEM FOR ARTICULATED VEHICLE

BACKGROUND OF THE INVENTION

I. Field of the Invention

This invention relates to steering systems for articulated vehicles, and more particularly to a steering system which combines vehicle articulation with steerable movement of one axle of the vehicle.

II. Description of Related Art Including Information Disclosed Under Sections 1.97 and 1.98

It is highly desirable to provide a steering system for off-road type vehicles such as tractors, graders, or scrapers, to name a few which provides a small turning radius and which also provides readily responsive steering control on rough terrain. An articulated vehicle having four wheel drive has been found to provide a small turning radius, while an even smaller turning radius can be obtained if one of the axles of the articulated vehicle is steerable, typically called wagon-wheel type steering. Articulation of the vehicle is typically provided by mounting a pair of hydraulic cylinders between the two portions of the vehicle which are pivotally secured to each other. The cylinders are mounted on opposite sides of the pivot point, such that causing the extension of a first cylinder and the retraction of the second cylinder will cause the vehicle to turn in a first direction, while retraction of the first cylinder and extension of the second cylinder will cause the vehicle to turn in the opposite direction. The steerable axle, usually the front axle is provided by mounting a hydraulic cylinder between a pivotally mounted axle and the portion of the vehicle on which it is pivoted. To effectively control the steering of a vehicle having both articulation and steerable axle steering, it is desirable that a system be provided which effectively monitors the position and rate of change of position of the articulated body portions with respect to each other, the position and rate of change of position of the steerable axle with respect to the body portion on which it is mounted, and the position and rate of change of position of the steering control or controls manipulated by the vehicle operator, and utilizes inputs from the monitored conditions to control actuation of the hydraulic cylinders in response to an operator's input to provide a combination and timing of steering most responsive to the operator's input.

U.S. Pat. No. 4,771,851 entitled: Steering Control System for Articulated Vehicle, granted on Sep. 20, 1988 to Nystueun et al, assigned to the assignee of the subject application, sets forth the three position and rate of change of position inputs mentioned above, and discloses a steering control system which utilizes the three position and two of the rate of change of position inputs set forth above. The teaching of U.S. Pat. No. 4,771,851 are incorporated herein by reference.

SUMMARY OF THE INVENTION

It is an object of this invention to provide a steering control system for articulated vehicles which is an improvement on that set forth in the above mentioned U.S. Pat. No. 4,771,851. More particularly, it is an object of this invention to provide a steering control system for an articulated vehicle, having a steerable axle, which includes as an input to the system a signal derived from monitoring the rate of change of the steering control or controls by vehicle operator manipulation. It is also an object of this invention to provide a steering control system, which is responsive to operator inputs and is adjustable to take into account the purpose for which the vehicle is being used. An additional object of the invention is to provide a self-compensating or correcting system capable of adjusting transitions in steering modes based upon overshoots or undershoots in past performance.

In accordance with this invention, a steering system is provided for an articulated vehicle, having a steerable axle, which includes a pair of articulation hydraulic actuators, and a steerable axle hydraulic actuator. A make-up valve system is provided to assist in returning the articulated vehicle to a straight line configuration following articulation steering. The timing and actuation of the hydraulic actuators is controlled by a microprocessor controller in response to operator manipulation of the steering control or controls and may take into account some or all of the six above-mentioned inputs as well as the response time of the hydraulic system. This timing and actuation may be adjusted or adapted based upon performance of the system. Further, the steering system is responsive to operator inputs and to the purpose for which the operator is using the vehicle. Where a number of vehicles are constructed of the same components, including hydraulic and electronic components including the microprocessor controller, a compensation checking feature is provided in the controller software to take into account differences which may occur in the hydraulic system components and the controllers on different vehicles.

DETAILED DESCRIPTION OF THE PREFERRED EMBODIMENT

Figure 1:
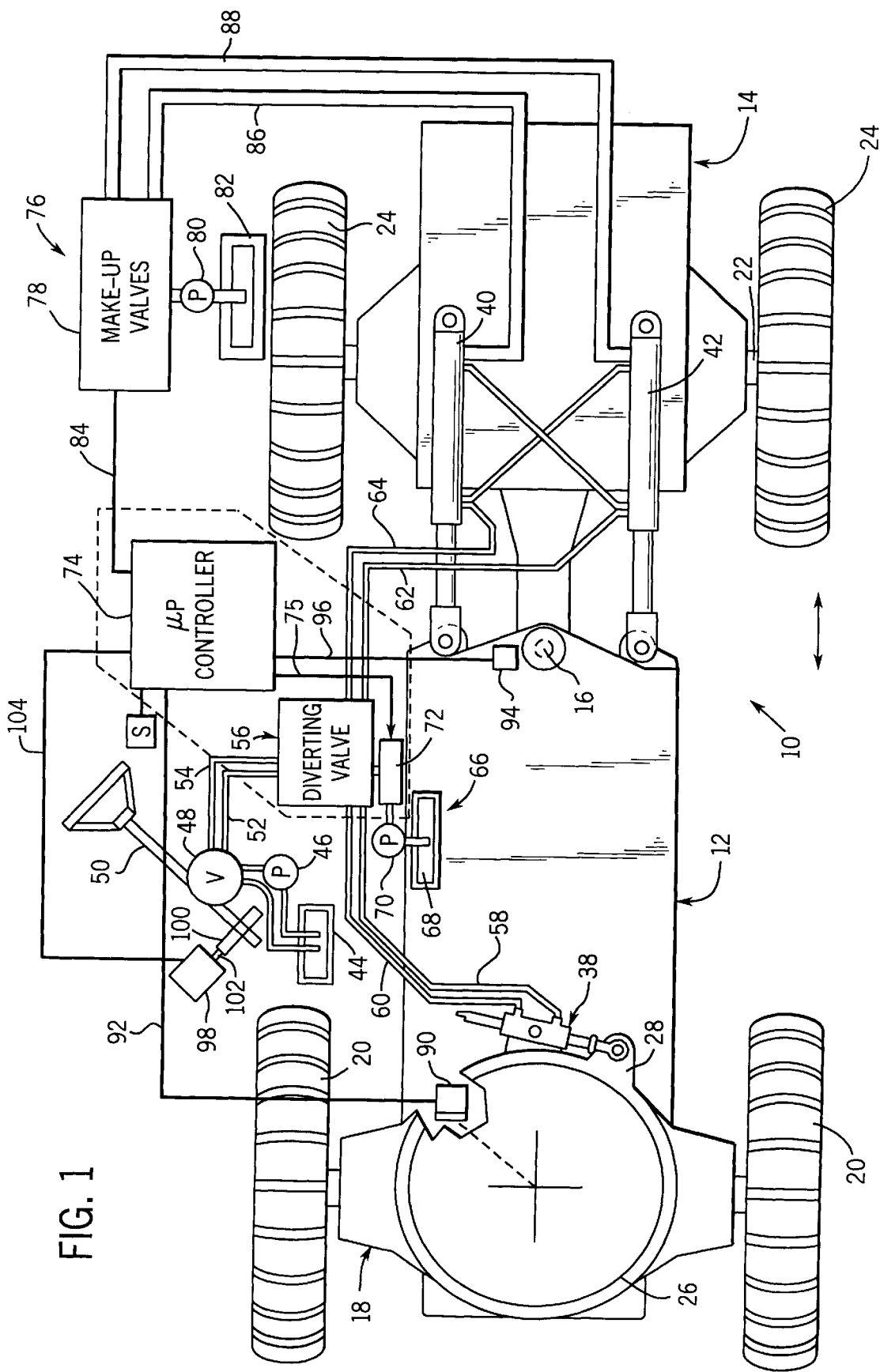
FIG. 1 is a diagrammatic top plan view of an articulated vehicle of the type employing the improved steering system of the present invention.

Referring to FIG. 1, an articulated vehicle 10 of the type to which the steering system of this invention is applicable, will be described. The articulated vehicle 10 has front and rear main body portions 12 and 14. The body portions 12 and 14 are pivotally connected to each other for articulation about vertical axis 16. An axle assembly 18 bearing wheels 20 is pivotally mounted on the front body portion 12. An axle 22 bearing wheels 24 is mounted on the rear main body portion 14. Taking into consideration typical applications of a vehicle of this type, all four wheels are driven. In addition to the articulation about the vertical axis 16, the body portions 12 and 14 are coupled so as to permit oscillate with respect to each other about a horizontal axis. The pivotal mounting of the axle 18 on the front body portion 12, is provided by an inner circular pivot guide 26 formed on the front body portion 12, and a surrounding pivot ring 28 provided on axle assembly 18.

Figure 2A:
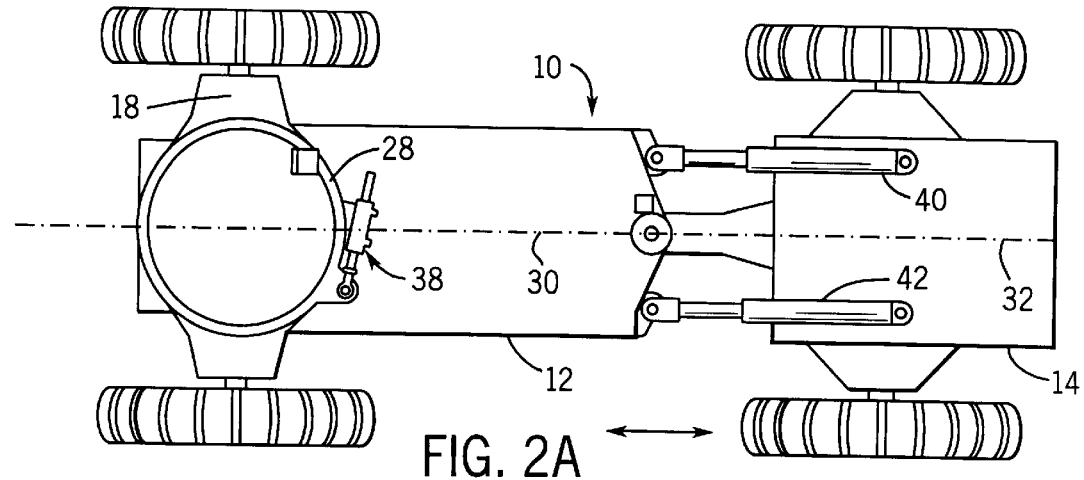
FIG. 2A is a diagrammatic top plan view of the articulated vehicle with the longitudinal axes of the frame portions in collinear alignment and the steerable axle axis aligned perpendicularly with respect to the axis of its frame portion.
Figure 2B:
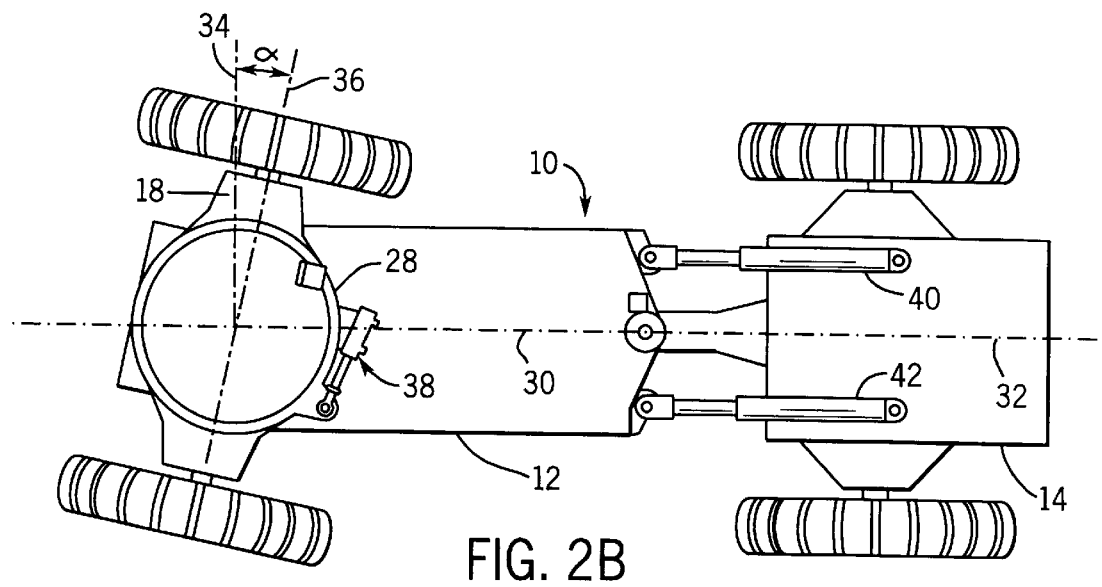
FIG. 2B is a view similar to that of FIG. 2A, except that the steerable axle is pivoted with respect to the axis of its frame portion.
Figure 2C:
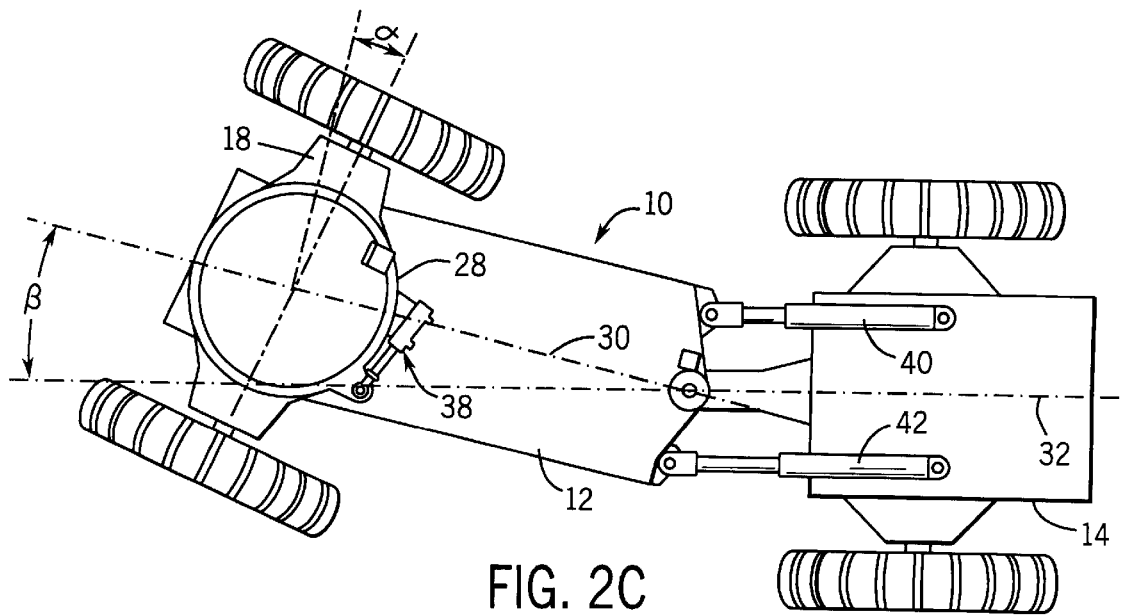
FIG. 2C is a view similar to that of FIG. 2B, except that the frame portions are articulated with respect to one another.

Referring to FIGS. 2A, 2B, and 2C, the manner in which the vehicle of FIG. 1 is steered will be described. Main body portions 12 and 14 are shown to have longitudinal axes 30 and 32 respectively. As shown in FIG. 2A, when the vehicle 10 is moving in a straight line, the axes 30 and 32 are aligned. When a turn is initiated by the operator, steering is first effected by pivoting of the axle 18 with respect to front body portion 12 as shown in FIG. 2B. This steerable axle steering is limited by the maximum angle to which the axle 18 can be pivoted with respect to body portion 12. The maximum angle is represented by the angle alpha between dashed line 34 perpendicular to the longitudinal axis 30, and dashed line 36 collinear with the axle 18. If the operator of the vehicle desires a greater turning angle, or a shorter turning radius, the steerable axle steering is augmented by articulation steering as shown in FIG. 2C. As shown is FIG. 2C the front and rear body portions 12 and 14 may be articulated at an angle beta, and represented by the angle between the axis 30 of the front body portion 12 and the dashed extension of the axis 32 of the rear body portion 14.

Steerable axle steering is effected by actuation of a hydraulic actuator 38 acting between the front body portion 12 and the surrounding pivot ring 28 of axle 18. Articulation steering is effected by actuation of hydraulic actuators 40 and 42 acting between front body portion 12 and rear body portion 14. The hydraulic steering system is designed to actuate actuators 40 and 42 in equal and opposite directions.

Referring again to FIG. 1, the principal components of the hydraulic system suitable for implementing the steering of the vehicle in accordance with this invention will be described. Pressurized hydraulic fluid is provided to the hydraulic operators from a reservoir 44 by a pump 46 through a control valve 48. A steering wheel and shaft 50 is mechanical coupled to the control valve 48, such that operation of the steering wheel causes the control valve 48 to provide pressurized fluid through a conduit 52 or 54 to a double selector valve 56.

The double selector valve 56 is a two-position six-way valve which allows fluid to flow either to the axle actuator 38 through conduits 58 and 60, or to the articulation actuators 40 and 42 through conduits 62 and 64. The double selector valve 56 is preferably a spool valve, the valve spool of which is spring loaded to a default position in which the conduits 52 and 54 are in communication with the conduits 62 and 64 connected to articulation actuators 40 and 42. By providing the spring bias on the valve spool, articulation steering will be available if valve control power is lost.

The valve spool of selector valve 56 is moved to overcome the spring bias by a control force provided by a pilot pressure system 66 as shown in FIG. 1, or for instance by a solenoid. The pilot pressure system 66 includes a reservoir 68, which may be combined with reservoir 44, a pump 70, which may instead be a second output from pump 46, and a pilot valve 72, which receives pressurized fluid from the pump 70. Operation of the pilot valve 72 is controlled by a microprocessor control system 74, which provides control signals via conductors 75.

Assuming the selector valve 56 is in the axle steering activated position, the selector valve 56 places the conduits 52 and 54 in communication with the conduits 58 and 60 to axle steering hydraulic actuator 38. The axle actuator 38 thus responds to variations in fluid pressure supplied to conduits 52 and 54 by control valve 48, which in turn responds to the operation of steering wheel 50. For instance, if the steering wheel is manipulated to turn the articulated vehicle 10 to the right, pressurized fluid will be provided through conduit 52 and selector valve 56 to conduit 58, which will cause the piston of hydraulic actuator 38 to move to the left, thus causing the axle 18 to be turned to the right.

In a preferred steering embodiment, the implementation of turning modes is sequential, such that upon initiation of a turn, steering by steerable axle is implemented first, and then, when the steerable axle reaches its limit of rotation, articulation steering is initiated. Thus, the microprocessor controller 74 is programmed to initially place the selector valve 56 in the position to provide steerable axle steering by placing the conduits 52 and 54 in communication with the conduits 58 and 60 to axle steering hydraulic actuator 38. As the axle 18 is pivoted to the maximum extend as represented by the angle alpha in FIG. 2B, the controller 74 signals the pilot valve 72 to switch the selector valve 56 to the default position, such that pressurized hydraulic fluid is transferred to conduits 62 and 64 to provide articulated steering, by retracting hydraulic actuator 40 and extending hydraulic actuator 42. To bring the vehicle 10 back to straight line travel as shown in FIG. 2A, the sequence of selector valve operation and fluid supply to actuators 40, 42 and 38 is reversed. Turning in the opposite direction from that shown in FIGS. 2B and 2C is accomplished in a similar manner to that described above, with the axle actuator 38 first being retracted to turn the axle assembly to the left as viewed in FIG. 2A. As the axle 18 is pivoted to the maximum extend to the left, the controller 74 signals the pilot valve 72 to switch the selector valve 56 to the default position, such that pressurized hydraulic fluid is transferred to conduits 62 and 64 to provide articulated steering, by extending hydraulic actuator 40 and retracting hydraulic actuator 42.

For cushioning the return to straight line movement from articulated steering, a make-up valve system 76 is provided. Another important feature of make-up valve system 76 is maintaining the vehicle articulation joint in a straight orientation during axle steering mode. The make-up valve system 76 includes make-up valves 78 which are provided pressurized hydraulic fluid by a pump 80 from a reservoir 82. Control signals are provided to the make-up valves 78 via conductors 84 from the microprocessor controller 74 to control the supply of pressurized hydraulic fluid to the articulation hydraulic actuators 40 and 42 through conduits 86 and 88. The control signals supplied to the make-up valves 78 to cushion transition from articulated steering to front axle steering result in a pulsed supply of pressurized fluid to the articulation hydraulic actuators 40 and 42 so as to more smoothly straighten or cushion the return of the vehicle to straight line operation. The relative on and off time of the make-up valves 78 is based on steering wheel speed and articulation angle, both of which have been previously discussed. The controller 74 also supplies a control signal to turn-off the make-up valve system 76 if the steering wheel has not been moved for a predetermined period of time. The controller 74 may also supply a control signal to the make-up valve system 76 to turn it off if the steering wheel speed is below a predetermined value.

To provide optimum steering of the vehicle 10, numerous inputs are provided to the controller 74, so as to cause the pilot valve 72 to actuate the selector valve 56 between the steerable axle steering and articulation steering positions at the most appropriate time. The inputs are derived from various known vehicle fixed and variable parameters and dynamic operating parameters. As previously mentioned, the dynamic operating parameters include the position and rate of change of position of the steerable axle with respect to the body portion on which it is mounted, position and rate of change of position of the articulated body portions with respect to each other, and the rate of change of position of the steering control or controls manipulated by the vehicle operator. Control signals for transitioning between steering modes could also be based upon the actual position of the steering control input device.

The position and rate of change of position of the steerable axle 18 with respect to the front body portion 12 is provided by a variable impedance potentiometer 90, which is mounted to detect and provide electrical signals via conductors 92 to microprocessor 74, indicative of the direction of pivot of the axle 18 with respect to the front body portion 12, the extend of such pivoting, and the rate of such pivoting (i.e. the degree of pivot per second). A manual control is provided with the processor 74 for calibrating the voltage of the variable impedance potentiometer 90 when the axle 18 is in its centered position, and when it is at its stop positions in the left and right directions as represented by the angle alpha. Calibration of the center position is used to center an operator visible display of the steering condition.

Similarly, the position and rate of change of position of the front and rear body portions 12 and 14 with respect to each other is provided by a variable impedance potentiometer 94, which is mounted to detect and provide electrical signals via conductors 96 to microprocessor 74, indicative of the direction of articulation of the body portions with respect to each other, the extend of such articulation, and the rate of such articulation (i.e. the degree of articulation per second). A manual control is provided with the processor 74 for calibrating the voltage of the variable impedance potentiometer 94 when the front and rear body portions 12 and 14 are aligned for front axle steering, as shown in FIGS. 2A and 2B.

The direction of rotation and the velocity or rate of turning (i.e. the degrees of turning per second) of the steering wheel 50 is detected by an optical encoder 98. The optical encoder 98 is coupled to the steering wheel and shaft 50 by a pulley 100 and belt 102. The optical encoder 98 includes an encoder disk which through the coupling provided by the pulley 100 and belt 102 makes one revolution for one revolution of the steering wheel 50. The encoder 98 produces two pulse streams which are 90 degrees out of phase. The period of the pulses corresponds to the speed at which the encoder disk and therefore the steering wheel 50 rotates. By determining which of the pulse streams leads the other, the direction of rotation of the encoder disk and therefore the steering wheel 50 can be determined. A particular encoder used in a preferred embodiment of this invention provides 128 pulses per revolution of the encoder disk and steering wheel 50. The optical encoder provides electrical signals via conductors 104 to microprocessor 74, indicative of the speed and direction of rotation of the steering wheel 50.

Figure 3:
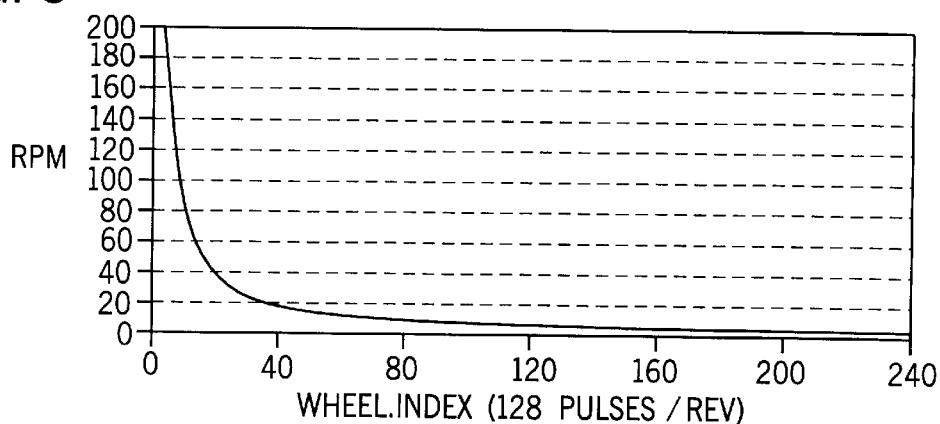
FIG. 3 is a graph representing the output from sensor responding to an operator's input to the steering system.

The microprocessor controller 74 uses the period and phase of the pulses to determine two variables. The first variable is called wheel .index. The wheel index is a integer number which is based on the measured period of one encoder pulse, and can range from 0 (fastest) to 255 (slowest). FIG. 3 is a graph showing the relationship between wheel.index and the revolution per minute of the encoder disk and steering wheel 50. A second variable is called wheel.direction, and has three possible values, one indicating that the encoder disk and steering wheel is turning counter-clockwise, another that the encoder disk and steering wheel is turning clockwise, and a third that the encoder disk and steering wheel are not turning. In the preferred embodiment of this invention a third condition, identified by the absence of encoder pulses for 0.7 seconds, indicates that the steering wheel is not moving. This condition is indicated by less than 0.671 revolutions per minute with the 128 pulse encoder. The presence of the third condition for a predetermined amount of time (e.g. 15 seconds) results in the controller 74 providing a control signal to make-up valve system 76 to turn it off. This feature prevents the make-up valve system 76 from being unnecessarily turned on and off, causing unwanted vehicle movement when the vehicle is stopped (e.g. as may result from windup of the vehicle tires). Other parameter states could, of course, provide an indication of this vehicle stopped condition.

The operation of the steering system as controlled by the controller 74, will now be considered. While in a most general sense steering is shifted from steerable axle steering to articulated steering when the axle 18 reaches the limit of its turning to right or left as represented by the angle alpha, and back to steerable axle steering when the longitudinal axis 30 and 32 of the body portion 12 and 14 are aligned, the actual shifting of the selector valve 56 by the pilot valve 72 is more precisely controlled by the controller 74 based upon the inputs to the controller derived from various known vehicle fixed and variable parameters and dynamic operating parameters. In accordance with this invention, the switching of the selector valve 56, as controlled by the controller 74, is in part based upon the position of the axle 18 as indicated by the electrical signals provided from the potentiometer 90, via conductors 92 to the controller 74, and the direction the steering wheel is moving as indicated by the electrical signals provided from the encoder 98, via conductors 104 to microprocessor 74. Due to the delay in turning hydraulic valves on or off, the actual shifting of selector valve 56 is made before the potentiometer 90 indicates that the axle 18 has reached the limit or stop point of its turning to right or left as represented by the angle alpha. As controlled by the controller 74, the offset of the switching from the stop point is based in part upon the speed at which the steering wheel is turning. If the steering wheel is turning at a high speed, the switching will be made further ahead of the limit or stop point of the turning of the axle 18, than if the steering wheel is turning at a lower speed. This same procedure is followed in a reverse order for transition from articulated to axle steering when straightening or aligning body portions 12 and 14, with the exception that make-up system 76 is called into play to cushion movement of the vehicle as described above.

In accordance with a preferred embodiment of this invention, the following formulas are used to determine the offset of the switching from the stop point at which the switching should occur from steerable axle to articulation steering (Offset$_{axle}$) and from articulation to steerable axle steering (Offset$_{articulation}$).

$$\text{Offset}_{axle} = K_{axle}/\text{wheel.index}$$

Where wheel.index corresponds to the period of the pulses coming from the optical encoder as shown in FIG. 3, and $K_{axle}$ is a constant made up of the following terms:

$$K_{axle} = W_{axle} \cdot T_{turnoff}/\text{encoder pulses per revolution}$$

Where:
  $W_{axle}$ is a constant representing the number of a/d counts that the axle potentiometer 90 moves as the steering completes one revolution.

$T_{turnoff}$ is a constant that represent the time required to turn off the selector valve. (The units for this constant are the same as those for the wheel.index.)

Encoder pulses per revolution is the number of encoder pulses that are produced for one revolution of the encoder.

and:

$$\text{Offset}_{articulation} = K_{articulation}/\text{wheel.index}$$

Where:

$K_{articulation}$ is a constant made up of the following terms:

$$K_{articulation} = W_{articulation} \cdot T_{turnon}/\text{encoder pulses per revolution}$$

Where:

$W_{articulation}$ is a constant representing the number of a/d counts that the axle potentiometer 90 moves as the steering completes one revolution.

$T_{turnon}$ is a constant that represents the time required to turn on the selector valve. (The units for this constant are the same as those for the wheel.index.)

Encoder pulses per revolution is the number of encoder pulses that are produced for one revolution of the encoder.

In accordance with another aspect of this invention, the controller may also be provided with a manual input, such as a potentiometer or switch (not shown) whereby the vehicle operator may adjust or set the point of transition between axle and articulated steering as indicated by angle α in FIGS. 2B and 2C to take into account such operating conditions as different uses of the vehicle such as the farming operation of planting, plowing, cultivating, etc., which implements may have different widths. Other operating conditions which may make the manual adjustment of the set points desirable, are the manner in which an implement is attached to the vehicle, such as by a single point or a three point hitch. By manually adjusting the set points for angle α the turning radius of the vehicle may be effectively adjusted and better performance is obtained for particular uses of the vehicles such as for propelling a particular implement of a particular size.

A compensation checking feature with built in adjustment is provided in programming the controller 74, such that differences between vehicles using the controllers and operating conditions may be taken into account. Using the compensation adjustment the offset equations become:

$$\text{Offset}_{axle} = (K_{axle} + \text{Adj}_{axle})/\text{wheel .index}$$

$$\text{Offset}_{articulation} = (K_{articulation} + \text{Adj}_{articulation})/\text{wheel .index}$$

In a specific example, where:

$W_{axle}$=275 (axle a/d counts per encoder revolution)

$W_{articulation}$=75 (articulation a/d counts per encoder revolution)

$T_{turnoff}$=588 (time units)

$T_{turnon}$=462 (time units)

encoder pulses per revolution=128,

The following constants result:

$k_{axle}$=1263

$k_{articulation}$=271

The adjustments used to compensate for the differences between vehicles are limited in programming the controller to the following:

$\text{adj}_{axle}$=±758

$\text{adj}_{articulation}$=±189

Figure 4:
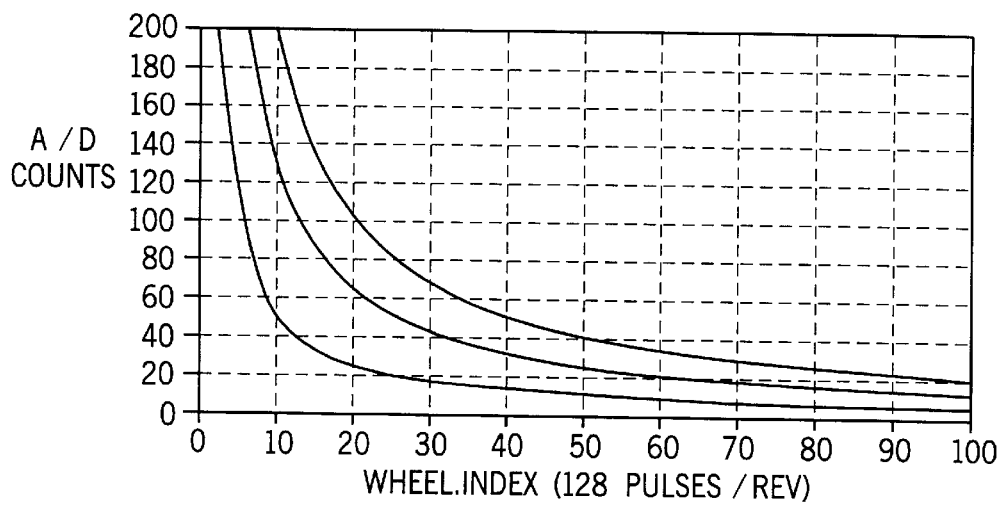
FIG. 4 is a graph representing the correlation between the rate of an operator's input to the steering system and the correction applied to the hydraulic system for changing from axle steering to articulation steering.
Figure 5:
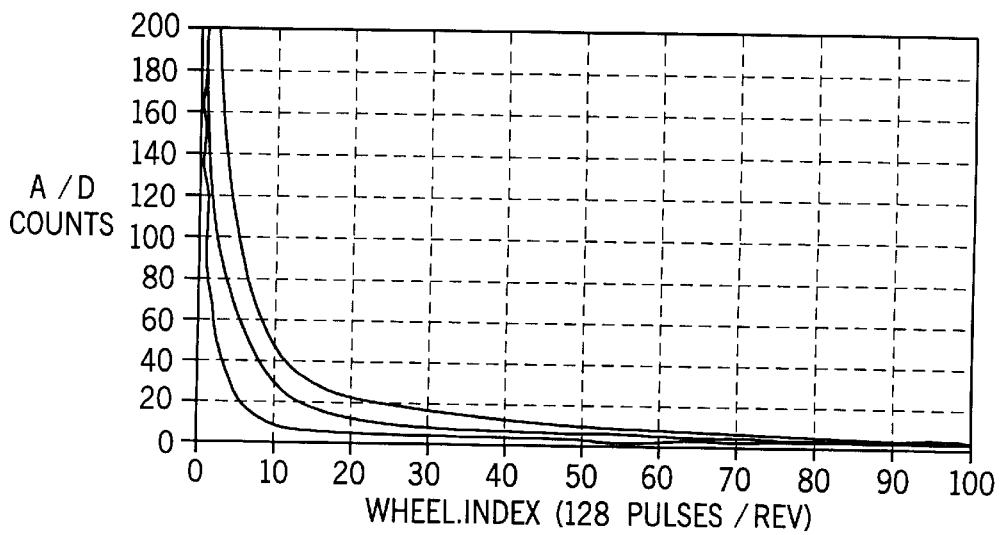
FIG. 5 is a graph, representing the correlation between the rate of an operator's input to the steering system and the correction applied to the hydraulic system for changing from articulation steering to axle steering.

FIG. 4 graphs the axle offset for the fastest 100 values of the wheel index. The center curve represents the axle offset with the adjustment set to zero. The upper curve shows the offset with the adjustment at its maximum and the lower curve shows the offset with the adjustment set to the minimum. Similarly, FIG. 5 graphs the articulation offset used for the fastest 100 values of the wheel index. The center curve represents the axle offset with the adjustment set to zero. The upper curve shows the offset with the adjustment at its maximum and the lower curve shows the offset with the adjustment set to the minimum.

Values necessary to implement the above-described algorithms are empirically determined in accordance with particular vehicle designs. In such determinations data is taken to determine the time required to turn on and off the double selector valve 56 by observing several transitions between steering modes, and averaging those times. As an example, in one type of vehicle, the average time for events following turn on and turn off of the selector valve were as follows:

| Event | Time (Seconds) |
| --- | --- |
| Double selector valve turned on | 0.000 |
| Axle movement noticed | 0.058 |
| Articulation begins to slow down | 0.067 |
| Full movement of axle noticed | 0.146 |
| Articulation movement stopped | 0.158 |
| Double selector valve turned off | 0.000 |
| Axle pivoting begins to slow down | 0.084 |
| Articulation movement noticed | 0.122 |
| Axle stopped moving | 0.172 |
| Full articulation movement | 0.201 |

Based on the values set forth above, a final axle rest point is determined by taking the average of three axle potentiometer readings at 170 mS, 180 mS, and 190 mS after a transition from articulation steering to axle steering. Similarly a final articulation rest point is determined by taking the average of three articulation potentiometer readings at 190 mS, 200 mS, and 210 mS after a transition from articulation to axle steering has been made.

A compensation checking feature is provided in the controller software to take into account differences which may occur in the hydraulic system components and the controllers on different vehicles using the same hydraulic system components and controllers. The controller 74 monitors the switching of the double selector valve and if they overshoot or undershoot on a consistent basis, an adjustment is added to the velocity compensation offset constant to correct the switch-over. Two velocity compensation adjustments may be provided, one for the switch-over from articulation to steerable axle steering and another for the switch-over from steerable axle steering to articulation steering. Both of these adjustments are stored in the EEPROM of the controller. If the compensation adjustment being used differs from the adjustment that is stored in the EEPROM by a predetermined amount, the new adjustment is stored in the EEPROM, but only if it has been 30 minutes since power-up and 30 minutes since the last time a new value was written to the EEPROM.

An axle velocity compensation adjustment is a value which must be added to the axle offset constant so that the switch-over will stop closer to the target. If during operation the three previous final axle rest points all overshoot or all undershoot, the axle velocity compensation adjustment will change so that the curve is closer to the previous three final axle rest points. The control will then continue to monitor the final axle rest points with the previous three final axle rest points set back to zero. If the compensation adjustment being used differs by more than 30 from the value stored in the EEPROM, the current axle compensation adjustment will be stored in the EEPROM.

An articulation velocity compensation adjustment is a value which must be added to the articulation offset constant so that switch-overs will stop closer to the target. If during operation the three previous final articulation rest points all overshoot or all undershoot, the articulation velocity compensation adjustment will change so that the curve is closer to the previous three final articulation rest points. The control then continues monitoring the final articulation rest points with the previous three final articulation rest points set back to zero. If the compensation adjustment being used differs by more than 25 from the value stored in the EEPROM, the current articulation compensation adjustment will be stored in the EEPROM.

While a preferred embodiment of the invention has been shown and described, it should be apparent to those skilled in the art that what has been shown and described is considered at present to be a preferred embodiment of the steering control system for an articulated vehicle of this invention. In accordance with the Patent Statute, changes may be made in the steering control system without actually departing from the true spirit and scope of this invention. The appended claims are intended to cover all such changes and modification which fall in the true spirit and scope of this invention.

What is claimed is:

1. An articulated vehicle of the type having a first body portion coupled to a second body portion by an articulation assembly and a steerable assembly coupled to the first body portion, the steerable assembly having a maximum turning angle with respect to the first body portion, the vehicle comprising:
    a hydraulic fluid source coupled to the articulation and steerable assemblies to selectively supply hydraulic fluid to the assemblies in response to control signals;
    a controller coupled to the hydraulic fluid source wherein the hydraulic fluid source diverts hydraulic fluid from the steerable assembly to the articulation assembly a compensatory time before the steerable assembly reaches the maximum turning angle in response to control signals generated by the controller; and
    a sensor coupled to the controller to generate an angle signal indicative of the steerable assembly turning angle, the controller receiving the angle signal and adjusting the compensatory time based on the steerable assembly undershooting or overshooting the maximum turning angle.

2. The articulated vehicle of claim 1, wherein the controller compares a steerable assembly resting angle to the maximum turning angle to determine undershooting and overshooting.

3. The articulated vehicle of claim 2, wherein the controller calculates the steerable assembly resting angle by averaging the steerable assembly turning angle at a plurality of points in time after the hydraulic fluid source diverts hydraulic fluid from the steerable assembly to the articulation assembly.

4. The articulated vehicle of claim 1, further comprising a memory, the memory containing a default adjustment value, the controller adjusting the compensatory time based on the default adjustment value.

5. The articulated vehicle of claim 4, the controller updating the default adjustment value based on the steerable assembly undershooting or overshooting the maximum turning angle.

6. The articulated vehicle of claim 5, the controller updating the default adjustment value only if the undershooting or overshooting is above a predetermined amount.

7. The articulated vehicle of claim 1, further comprising a steering input mechanism, the compensatory time being calculated from at least the rate of change of the steering input mechanism.

8. The articulated vehicle of claim 1, wherein the controller adjusts the compensatory time only within a specified range.

9. The articulated vehicle of claim 1, wherein the maximum turning angle is user-adjustable.

10. The articulated vehicle of claim 1, wherein the steerable assembly includes an axle in a wagon-wheel configuration.

11. The articulated vehicle of claim 10, wherein the first body portion is pivotally coupled to the second body portion.

12. An articulated vehicle of the type having a first body portion coupled to a second body portion by an articulation assembly and a steerable assembly coupled to the first body portion, the articulation assembly having a turning angle corresponding to the angle between the first and second body portions, the vehicle comprising:
    a hydraulic fluid source coupled to the articulation and steerable assemblies to selectively supply hydraulic fluid to the assemblies in response to control signals;
    a controller coupled to the hydraulic fluid source wherein the hydraulic fluid source diverts hydraulic fluid from the articulation assembly to the steerable assembly a compensatory time before the articulation assembly turning angle is approximately zero degrees in response to control signals generated by the controller; and
    a sensor coupled to the controller to generate an angle signal indicative of the articulation assembly turning angle, the controller receiving the angle signal and adjusting the compensatory time based on the articulation assembly undershooting or overshooting the approximately zero degrees.

13. The articulated vehicle of claims 12, wherein the controller compares an articulation assembly resting angle to the approximately zero degrees to determine undershooting and overshooting.

14. The articulated vehicle of claim 13, wherein the controller calculates the articulation assembly resting angle by averaging the articulation assembly turning angle at a plurality of points in time after the hydraulic fluid source diverts hydraulic fluid from the articulation assembly to the steerable assembly.

15. A method for controlling steering for an articulated vehicle of the type having a first body portion coupled to a second body portion by an articulation assembly and a steerable assembly coupled to the first body portion, the steerable assembly having a maximum turning angle with respect to the first body portion, the method comprising:
    supplying hydraulic fluid to the steerable assembly;
    diverting hydraulic fluid from the steerable assembly to the articulation assembly a compensatory time before the steerable assembly reaches the maximum turning angle;
    measuring a steerable assembly resting angle;
    comparing the steerable assembly resting angle to the maximum turning angle; and
    adjusting the compensatory time based on the steerable assembly undershooting or overshooting the maximum turning angle.

16. The method of claim 15, wherein the measuring includes averaging the steerable assembly turning angle at a plurality of points in time after the diversion of hydraulic fluid.

17. The method of claim 15, wherein the compensatory time is adjusted based on a default adjustment value.

18. The method of claim 17, further comprising updating the default adjustment value based on the steerable assembly undershooting or overshooting the maximum turning angle.

19. The method of claim 18, wherein the default adjustment value is updated only if the undershooting or overshooting is above a predetermined amount.

20. The method of claim 15, the articulated vehicle including a steering input mechanism, wherein the compensatory time is calculated from at least the rate of change of the steering input mechanism.

21. The method of claim 15, wherein the adjusting of the compensatory time is limited to within a specified range.

22. The method of claim 15, wherein the maximum turning angle is user adjustable.

23. The method of claim 15, wherein the steerable assembly includes an axle in a wagon-wheel configuration.

24. The method of claim 15, wherein the first body portion is pivotally coupled to the second body portion.

25. An articulated vehicle of the type having a first body portion coupled to a second body portion by an articulation assembly and a steerable assembly coupled to the first body portion, the vehicle comprising:

means for delivering hydraulic fluid to the steerable assembly during steerable assembly steering and to deliver hydraulic fluid to the articulation assembly during articulation assembly steering;

means for diverting hydraulic fluid from the steerable assembly to the articulation assembly a compensatory time before the steerable assembly reaches a predetermined turning angle; and means for adjusting the compensatory time based on the steerable assembly undershooting or overshooting the predetermined turning angle.

26. The articulated vehicle of claims 25, further comprising means for measuring a steerable assembly resting angle.

27. The articulated vehicle of claim 26, further comprising means for comparing the steerable assembly resting angle to the predetermined turning angle.

28. The articulated vehicle of claim 26, wherein the means for measuring includes means for averaging the steerable assembly angle at a plurality of points in time after the diverting of hydraulic fluid.

29. The articulated vehicle of claim 25, wherein the predetermined turning angle is a maximum turning angle of the steerable assembly with respect to the first body portion.

30. An articulated vehicle of the type having a first body portion coupled to a second body portion by an articulation assembly and a steerable assembly coupled to the first body portion, the articulation assembly having a turning angle corresponding to the angle between the first and second body portions, the vehicle comprising:

means for delivering hydraulic fluid to the steerable assembly during steerable assembly steering and to deliver hydraulic fluid to the articulation assembly during articulation assembly steering;

means for diverting hydraulic fluid from the articulation assembly to the steerable assembly a compensatory time before the articulation assembly turning angle reaches a predetermined angle; and means for adjusting the compensatory time based on the articulation assembly undershooting or overshooting the predetermined angle.

31. The articulated vehicle of claim 30, further comprising means for measuring an articulation assembly resting angle.

32. The articulated vehicle of claim 31, further comprising means for comparing the articulation assembly resting angle to the predetermined angle.

33. The articulated vehicle of claim 31, wherein the means for measuring includes means for averaging the articulation assembly angle at a plurality of points in time after the diversion of hydraulic fluid.

34. The articulated vehicle of claim 30, wherein the predetermined angle is approximately zero degrees.

\* \* \* \* \*